May 26, 1970        M. H. RHODES        3,514,719
ELECTRIC ANALOG ANGULAR RATE DERIVING CIRCUIT
Filed June 21, 1967
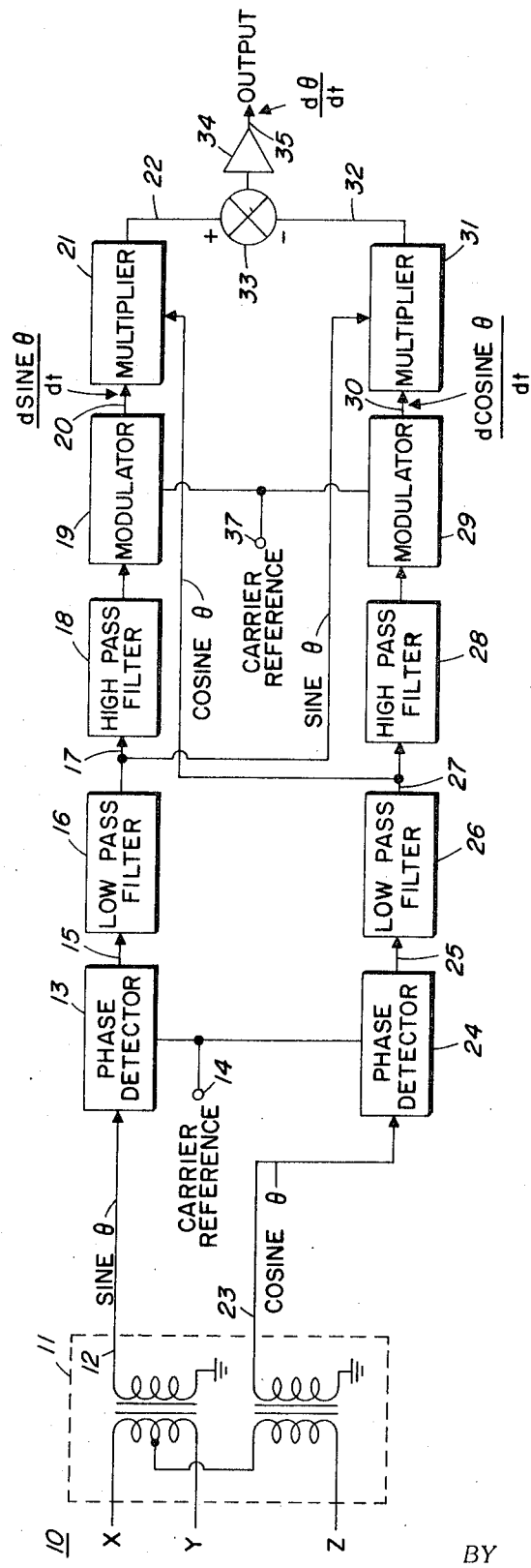
INVENTOR.
MELVIN H. RHODES
BY
Moody & Anderson
AGENTS United States Patent Office 3,514,719
Patented May 26, 1970

3,514,719
ELECTRIC ANALOG ANGULAR RATE DERIVING CIRCUIT
Melvin H. Rhodes, Cedar Rapids, Iowa, assignor to Collins Radio Company, Cedar Rapids, Iowa, a corporation of Iowa
Filed June 21, 1967, Ser. No. 647,760
Int. Cl. H03c *3/40;* H03d *13/00*
U.S. Cl. 332—23                                7 Claims

ABSTRACT OF THE DISCLOSURE

A static circuitry for developing a signal proportional to the rate of change of an angular parameter as defined by multiwire synchro signals. The circuitry eliminates the need for electromechanical rate-generator servo loop approaches by rate-taking in two channels to which sine and cosine functions of the variable are applied, followed by cross-multiplications of each signal with the rate of change of the other, with subsequent differential combination of products to arrive at a signal proportional to the rate of change of the angular parameter with respect to time.

---

This invention relates generally to circuitry for deriving an electrical signal proportional to the rate of change of a signal which varies as a function of a given parameter. More particularly, the present invention relates to circuitry for electronically deriving a signal proportional to the rate of change of an angular input signal as might be represented by a three-wire synchro signal or a two-wire synchro resolver signal, each of which comprise signals the relative amplitudes and phases of which mutually define an angle. Conventional systems for deriving a rate signal from three-wire signal input information or from two-wire input information have employed servo motor generators in a closed loop where the servo motor is caused to rotate at a speed proportional to the changing input parameter. The motor may then be utilized to drive a generator the output of which is an electrical signal proportional to the rate of change of the angle defined by the multi-wire input information.

The present invention has a primary object the provision of a solely electronic circuitry for deriving rate information from synchro signals. While prior art rate deriving arrangements have been primarily electromechanical in nature, the circuitry of the present invention may be readily implemented from solid state circuitries.

The invention is featured in the provision of applying signals proportional to the sine and cosine functions of the variable angular input parameter (deriving these two signals in the case of three-wire synchro input signals) to first and second signal channels each of which involves a rate taking as by a signal differentiation. The signals in the two channels are subsequently intermultiplied and the product from the multipliers finally recombined so as to provide an output signal proportional to rate of change of the angle as defined by two or three-wire synchro input information.

These and other objects and features of the present invention will become apparent upon reading the following description in conjunction with the accompanying drawing.

The drawing is a functional block diagram of a rate deriving circuit in accordance with the present invention.

The system defined by the present invention permits rate taking from synchro input information by means which permit a completely solid state electronic circuitry to be employed.

The system to be described might be applicable, for example, for deriving a rate of turn signal from a three-wire compass input signal. Unlike known rate taking arrangements involving electromechanical servo loops, the present invention lends itself to low power, light weight circuitry with minimal space requirement as compared to the prior art arrangements. The embodiment depicted is one which illustrates a three-wire synchro input signal 10 (designated by lines X, Y and Z) being applied to a Scott-T transforming arrangement 11 which converts the input signal to two signals 12 and 23 proportional to the sine and cosine respectively of the varying input parameter $\theta$. The signal proportional to sine $\theta$ and cosine $\theta$ are applied to identical channels. It is to be realized that in the event the circuitry is to be employed to derive rate from a conventional two-wire resolver signal that the sine and cosine functions would inherently be available for application to the respective channels and the Scott-T transformer would not be included.

Each of the channels depicted in the drawing includes means for phase detecting the sinusoidal function (sin $\theta$ or cos $\theta$) against a reference carrier source the frequency of which equals the carrier frequency of the sinusoidal signal, it being understood that the synchro signal is comprised of a carrier, of, for example, 400 Hz. which is amplitude modulated as a function of the angular relationship between the synchro stator and rotor to develop the sinusoidal synchro output signals.

With reference to the upper channel of the drawing, a signal 12 proportional to sine $\theta$ is thus applied to a phase detector 13 along with a carrier reference signal 14 to develop an output signal 15 comprised of a DC signal which varies as a function of sine $\theta$. The phase detector output 15 may be applied to a low pass filter 16 to remove ripple frequencies. The DC output 17 from low pass filter 16 is applied to a high pass filter 18 in the upper channel. The output of high pass filter 18 is proportional to the rate of change of the input signal with respect to time. The output from high pass filter 18 may be applied to a modulator 19 to convert the DC function to AC at the carrier frequency, with output 20 from modulator 19 being applied as a first input to a multiplier 21.

Referring to the lower channel of the drawing, the input signal 23 proportional to cosine $\theta$ is likewise applied to a phase detector 24 along with the carrier reference 14 to develop a DC output 25 proportional to cosine $\theta$ which is subsequently applied through low pass filter 26, to a high pass filter 28 where it is differentiated with respect to time. The output from high pass filter 28 is applied to a modulator 29 the output 30 of which is applied as a first input to a further multiplier 31.

The second inputs to the multipliers in the upper and lower channels comprise respective outputs from the low pass filters in the other one of the channels. Thus, the second input to multiplier 21 in the upper channel is comprised of the output 27 from low pass filter 26 in the lower channel and is proportional to cosine $\theta$. The second input to the multiplier 31 in the lower channel is comprised of output 17 from low pass filter 16 in the upper channel and is proportional to sine $\theta$.

The outputs 22 and 32 from multipliers 21 and 31 are applied to a signal combining circuitry 33. The combined channel outputs are then applied to an amplifier 34 to develop an output signal 35 which may be shown to be proportional to the rate of change of the input variable $\theta$, which in turn is defined by the two or three-wire synchro input signals under consideration.

The manner in which the output 35 of the drawing comprises a rate signal may be substantiated from a consideration of the mathematical operations effected by the aforedescribed circuit arrangement.

The signal 12 applied to the upper channel of the drawing is proportional to sine $\theta$. The signal on line 17 of the upper channel is likewise proportional to sine $\theta$ and is applied as one input to multiplier 31 in the lower channel. Signal 17 is additionally differentiated by high pass filter 18 and applied to multiplier 21 in the upper channel.

Similarly, the output 26 from low pass filter 27 in the lower channel is applied to the multiplier 21 in the upper channel and is further differentiated with respect to time by high pass filter 28 in the lower channel and applied as an input to multiplier 31 in the lower channel. The inputs to multiplier 21 in the upper channel may then be expressed as:

$$\frac{d \sin \theta}{dt}$$

and cosine $\theta$, respectively.

The inputs to multiplier 31 in the lower channel may be expressed as:

$$\frac{d \cos \theta}{dt}$$

and sine $\theta$, respectively.

The output from multiplier 31 may be expressed as the product of its inputs. If the multiplier outputs are combined in circuitry 33 in a subtractive manner (opposite sense), as indicated by the relative polarities in the figure, the output from the combiner 33 may be expressed as:

$$V_{out} = \left(\frac{d \sin \theta}{dt} \cos \theta - \frac{d \cos \theta}{dt} \sin \theta\right) \quad (1)$$

Since:

$$\frac{d \sin \theta}{dt} = \cos \theta \frac{d\theta}{dt} \quad (2)$$

and $$\frac{d \cos \theta}{dt} = -\sin \theta \frac{d\theta}{dt} \quad (3)$$

Substituting (2) and (3) in (1):

$$V_{out} = \left(\frac{d\theta}{dt} \cos \theta\right) \cos \theta + \left(\frac{d\theta}{dt} \sin \theta\right) \sin \theta$$

$$V_{out} = \frac{d\theta}{dt} (\cos^2 \theta + \sin^2 \theta)$$

But;

$$\cos^2 \theta + \sin^2 \theta = 1 \text{ (identity)}$$

Therefore:

$V_{out} = d\theta/dt$, and $V_{out}$ is seen to be the rate of change of the angle $\theta$ with respect to time.

The significance of the minus sign in the above expression (1) implies that the product outputs from the two multipliers 21 and 31 are combined in a subtractive sense. The figure illustrates this condition functionally by appropriate polarities as concerns the inputs to the signal combiner 33. The combining of these two products in a subtractive sense of course, merely implies a reversal of sense (phase in the case of AC signal and polarity in the case of DC signals) as they are combined. This condition may be implemented in a number of ways. If multipliers are employed of a type as described in the above referenced copending application, the output signal from the multipliers is an AC signal. Either the signal output or its complement (opposite sense) may be selected as the multiplier output and the combining operation in the opposite sense may readily be affected by choosing the signal output from one multiplier and the signal complement output from the other of the multipliers. Further, should the multipliers be identical circuitries with outputs taken from identical points within the circuitry, the reversal of sense might be implemented by applying the carrier signal to the modulators 19 and 29 which precede the multipliers in mutually opposite phase. In either of these arrangements the combiner 33 may comprise a simple resistive adding network. Still further, by applying in-phase carrier signals to modulators 19 and 29, and taking identical outputs from multipliers 21 and 31, signal combining network 33 might comprise a transformer with the multiplier output being applied to the respective terminals of the primary winding of the transformer.

The output from the high pass filters 18 and 28 in the respective channels of the drawing were described as being applied through modulators 19 and 29 respectively to the multipliers 21 and 31. Inclusion of modulators 19 and 29 is not to be considered a limitation as concerns the invention.

The modulators might have applied thereto a reference carrier signal as second inputs so as to convert the DC input signal to an AC signal for application to the multipliers. Thus, the modulators might comprise electronic choppers, for example. The multipliers 21 and 31, with the inclusion of the modulators to convert the DC signals from the high pass filters to AC, might comprise a preferred type of multiplier as described in my copending application, Ser. No. 577,444, filed Sept. 6, 1966, entitled "Analog Multiplier," in which is described a solid state multiplier which multiplies a DC input signal by an AC input signal. It is considered that signal multipliers operating on a pair of DC input signals or AC input signals may be employed in which case the modulators would not be included in the channels. The inclusion of modulators 19 and 29 therefore is not by way of limitation but for the purpose of employing analog multipliers of the type described in the above-referenced application.

The invention basically comprises the multiplications of a signal proportional to time derivative of the sine $\theta$ function with the cosine $\theta$ function; and the multiplication of the time derivative of the cosine $\theta$ function with the sine $\theta$ function, with subsequent combination to arrive at the rate indicative output signal.

The phase detectors 13 and 24 are further not by way of limitation. In order to perform the differentiating functions, the carrier signals 12 and 23 proportional to sine $\theta$ and cosine $\theta$, respectively, must be converted to DC signals which are functions of sine $\theta$ and cosine $\theta$, respectively. Phase detectors 13 and 24 might then appropriately be termed synchronous demodulators which develop signals proportional to sine $\theta$ and cosine $\theta$, it being understood that these signals carry the algebraic sign implied by sine $\theta$ and cosine $\theta$, and are not the absolute values of the functions as expressed by $|\sin \theta|$ and $|\cos \theta|$.

I claim:

1. Means for developing a signal proportional to the rate of change of an angular variable $\theta$ with respect to time as defined mutually by first and second synchro generated carrier signals respectily amplitude modulated proportional to sine $\theta$ and cosine $\theta$, comprising, first and second signal conversion means respectively receiving said first and second sinusoidally molulated carrier signals, said first and second signal conversion means comprising first and second phase detectors receiving said first and second modulated carirer signals as respective first inputs thereto, an unmodulated source of reference carrier signal having a frequency equal that of the carrier component of said first and second synchro generated modulated carrier signals applied as a second input to each of said phase detectors, the outputs from said phase detectors comprising DC voltages proportional to sine $\theta$ respectively, first and second signal differentiating means receiving the respective outputs from said first and second conversion means and developing signals proportional to the rate of change of the input signals thereto with respect to time, a first signal multiplier receiving the outputs from said first signal converting means and said second signal differentiating means as respective first and second inputs thereto, a second signal multiplier receiving the outputs from said second signal converting means and said first signal differentiating means as respective first and second inputs thereto, and signal combining means receiving the outputs from said first and second signal multipliers, the output from said signal combining means being a signal proportional to the rate of change of the angular quantity $\theta$ with respect to time.

2. A signal development means as defined in claim 1 further comprising first and second low pass filters respectively receiving the outputs from said first and second phase detectors, the outputs from said low pass filters being connected as the aforedefined inputs to said first and second signal differentiating means, the outputs from said first and second low pass filters being additionally connected as the aforedefined inputs to each of said first and second multipliers.

3. A signal development means as defined in claim 2 wherein said first and second signal differentiating means comprise respective high pass filters.

4. A signal developement means as defined in claim 2 wherein said multipliers are of a type effecting multiplication of an AC input signal with a DC input signal, and further comprising first and second signal modulators receiving the outputs from said first and second signal differentiating means as respective first inputs thereto, a further modulated source of reference carrier frequency signal being applied as a second input to each of said modulators, and the outputs from said first and second modulators being applied as the respective first inputs to said signal multipliers.

5. A signal development means as defined in claim 4 wherein said first and second modulated carrier input signals comprise the respective outputs from a Scott-T transformer, the input signal to said Scott-T transformer comprising a three-wire synchro signal definitive of the variable $\theta$.

6. A signal development means as defined in claim 4 wherein the outputs from said first and second signal multipliers comprise in-phase carrier signals, said first and second multipliers comprise identical circuitry, and said second combining means comprising means for subtracting the output of said second multiplier from the output of said first multiplier.

7. A signal development means as defined in claim 4 wherein said further unmodulated reference carrier signal as applied to said first and second signal modulators is applied in mutually opposite phases, the outputs from said first and second modulators comprising mutually oppositely phased carrier signals, said first and second multipliers comprising identical circuitry, and said signal combining means comprises means for adding the outputs from said first and second multipliers.

References Cited
UNITED STATES PATENTS

| | | | |
|---|---|---|---|
| 3,243,791 | 3/1966 | Currie | 329—50 X |
| 3,259,800 | 7/1966 | Evans | 328—133 X |
| 3,297,946 | 1/1967 | Clay | 332—123 |
| 3,320,552 | 5/1967 | Glasser | 332—23 |

ALFRED L. BRODY, Primary Examiner

U.S. Cl. X.R.

307—295; 318—18; 329—50; 332—48

UNITED STATES PATENT OFFICE
CERTIFICATE OF CORRECTION

Patent No. 3,514,719　　　　　　　　　　　　　　May 26, 1970

Melvin H. Rhodes

It is certified that error appears in the above identified patent and that said Letters Patent are hereby corrected as shown below:

Column 4, line 51, "respectily" should read -- respectively --; line 57, "carirer" should read -- carrier --. Column 5, line 23, "modulated" should read -- unmodulated --.

Signed and sealed this 12th day of January 1971.

(SEAL)
Attest:

Edward M. Fletcher, Jr.　　　　　　　　　　　　　WILLIAM E. SCHUYLER, JR.
Attesting Officer　　　　　　　　　　　　　　　　　Commissioner of Patents